Patented Sept. 1, 1931

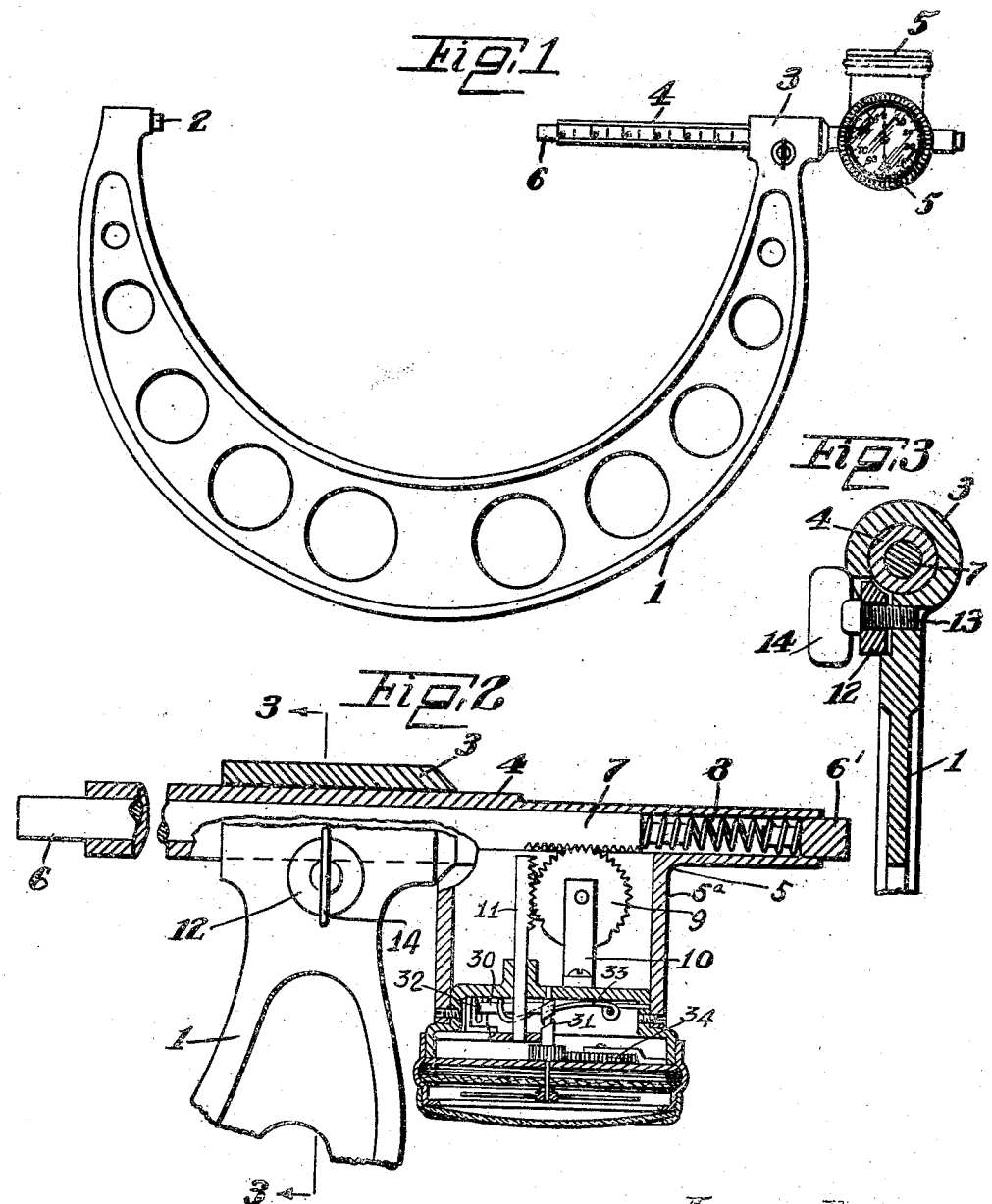

1,821,398

UNITED STATES PATENT OFFICE

ROBERT J. O. SIMPSON, OF ATHOL, MASSACHUSETTS, ASSIGNOR TO THE L. S. STARRETT COMPANY, OF ATHOL, MASSACHUSETTS, A CORPORATION OF MASSACHUSETTS

MICROMETER CALIPERS

Application filed August 21, 1922. Serial No. 583,160.

This invention relates to micrometer calipers, and particularly to a dial indicator attachment for an outside micrometer calipers.

In calipering objects of large diameter with the ordinary micrometer, it is difficult for the mechanic to know when the contact points are engaged with the object at diametrically opposite points.

The object of my invention is to provide a micrometer which will overcome this objection.

According to my invention I substitute for the usual sleeve and spindle of an outside micrometer calipers of standard type a dial indicator attachment comprising a sleeve rotatably and slidably mounted in the usual spindle bearing of the micrometer frame, a dial indicator fast on said sleeve and having its dial disposed parallel to said sleeve, a contact element slidable within said sleeve, and motion converting connections between said contact element and the pointer of the dial indicator for transmitting the reciprocation of said element to said pointer as rotary motion.

The sleeve is graduated, preferably at intervals of one inch. By adjusting the sleeve in its bearing until one of its graduations registers with a reading line, as for example the end of the sleeve bearing itself, and by setting the pointer of the dial gauge at zero, a rough preliminary calipering may be had which will indicate to the mechanic that the object being calipered is within a certain diameter. The dial gauge allows the mechanic a preliminary reading equal to the capacity of the gauge itself, here shown as two hundred thousandths, so that regardless of the position in which he brings the device into contact with the work, within the limits of his ability to see the dial, the exact diameter of the work will be registered upon the dial. My micrometer attachment is particularly useful in making transfer measurements, and not only permits a visualized indication of the calipering but also enables the registered reading to be observed conveniently at all times and under all conditions of use regardless of the position in which the calipers is held or the user occupies, since the dial indicator mounting sleeve and with it the dial may be turned relative to the calipers frame to a position in which the dial can be readily observed by the user.

The construction and manner of using my attachment, together with a selected embodiment which well illustrates the principles involved, is described and shown in the accompanying specification and drawings, and the characteristic features of novelty are particularly pointed out in the appended claims.

Fig. 1 is an elevation of an outside micrometer calipers of standard type equipped with my invention, and indicating two of the large number of positions to which the dial indicator may be turned relative to the calipers frame.

Fig. 2 is a partial longitudinal section, and

Fig. 3 is a section on the line 3—3 of Fig. 2.

I have indicated at 1 the frame of an outside micrometer calipers of standard type, at 2 the anvil thereof, and at 3 the spindle bearing.

My attachment consists of a sleeve 4 set through the bearing 3 for both rotative and sliding travel and carrying beyond the frame 1 a dial indicator of standard type which is disposed at right angles to said sleeve with its dial 5 parallel to the line of travel of a slidable contact element 6 which is mounted within said sleeve and normally projects slightly beyond the inner end thereof as shown in Fig. 1. Preferably the base 5' of the dial indicator 5 is formed integrally with the sleeve 4, and the casing 5ª of said indicator extends in a plane transverse to the longitudinal axis of said sleeve. This positions the dial of the indicator, which surmounts said casing, in a plane which is parallel to the sleeve axis, and the dial always maintains this position regardless of its rotative adjustment relative to the frame 1.

The sleeve 4 is graduated preferably at intervals of one inch and said graduations are readable with reference to some stationary part, as for example the inner edge of the sleeve bearing 3.

The reciprocation of the contact element 6 is transmitted to the pointer of the dial indicator as rotary motion by a rack bar 7 slidable within the sleeve 4 and as here shown constituting a series of rack teeth formed on one edge of the contact element 6 itself. A coil spring 8 Fig. 2, is interposed between said rack bar and a plug 6' fixed in the opposite end of the sleeve 4 and said spring opposes the inward movement of the contact element 6. The rack bar 7 meshes with a gear segment 9 mounted in a split bearing 10 depending from the underface of the dial casing. The gear segment 9 meshes with a vertical rack bar 11 reciprocable within the dial casing and the rack bar 11 is operatively connected with the pointer of the dial indicator by any suitable motion transmitting connections.

Such connections and the dial indicator itself may be of any preferred construction, but are preferably of the general construction shown in the patent to Reisner, No. 1,419,306, June 13, 1922, to which reference is made. As here shown (see Fig. 2) these motion-transmitting connections comprise a transverse pin 30 carried by the vertical rack bar 11. One end of said pin is disposed in a spiral groove cut in the pointer barrel 31 and the opposite end of said pin is guided in a slotted guide 32 fulcrumed on the casing of the dial indicator. The movement of the rack bar 11 towards the dial of the dial indicator is opposed by a coil spring 33, which is anchored within said casing and engages the pin 30 at one end, and the rotation of the pointer barrel 31 is transmitted to the pointer of the dial indicator through a reducing gear train 34.

The rotative adjustment of the sleeve 4 as well as the longitudinal adjustment thereof, is held by any suitable clamp. As here shown, such clamp consists of a clamping piece 12 mounted on a bolt 13 set transversely through the frame 1 adjacent the bearing 3 and provided with a wing nut 14 by means of which it may be turned to tighten the clamping piece 12 against and release it from the sleeve 4 the bearing 3 being partially cut away to expose said sleeve to said clamping piece.

In use, the sleeve 4 may be initially adjusted to bring one of its graduations opposite the reading line. With the sleeve so adjusted and with the pointer of the dial gauge set at zero, the mechanic will know when he applies the micrometer to the work that the work is within a certain diameter. The dial gauge allows the mechanic a preliminary reading equal to the capacity of the gauge itself, so that when the anvil 2 and contact stem 6 are brought against opposite sides of the work, the stem 6 will be moved inwardly within the sleeve and through the rack bar 7, segment 9 and rack bar 11, the pointer will be rotated to register the exact diameter of the work on the dial.

The longitudinal adjustment of the sleeve 4 permits the calipers to be used for a widely varying range of objects, and the rotative adjustment of said sleeve permits the dial of the indicator to be turned to the position in which it may be most readily viewed. It will be noted that the dial indicator 5 is mounted between the sliding contact 6 and the fixed plug 6', and that these elements 6 and 6' are alined with each other. This permits the attachment to be used as an inside micrometer by simply unloosening the clamping bolt 13 and bodily disconnecting the attachment from the frame 1.

Various modifications in the form and construction of my device may obviously be resorted to without departing from the spirit of my invention if within the limits of the appended claims.

What I therefore claim and desire to secure by Letters Patent is:

1. In combination with the frame of an outside micrometer calipers, said frame being provided with a bearing, a dial indicator having a pointer and rotatably mounted in said bearing, a contact element associated with said dial indicator, and provided with a rack, a spring opposing the movement of said contact element in one direction, a gear segment meshing with said rack, a second rack disposed at right angles to said first named rack and meshing with said gear segment, and operative connections between said second rack and the pointer of said dial indicator.

2. In combination with the frame of an outside micrometer calipers, said frame having an anvil and a spindle bearing in alinement with said anvil, a sleeve rotatably and longitudinally adjustable in said bearing, a dial indicator having a pointer, said dial indicator being mounted on said sleeve beyond the frame with its dial disposed substantially parallel to the axis of said sleeve, a contact element slidable within said sleeve, operative connections between said contact element and the pointer of the dial indicator, and a spring opposing the movement of said contact element in one direction.

3. In combination with the usual frame of an outside micrometer calipers, said frame having an anvil and a spindle bearing in alinement with said anvil, a sleeve rotatably and longitudinally adjustable in said bearing, a dial indicator having a pointer, said dial indicator being mounted on said sleeve beyond the frame with its dial disposed substantially parallel to the axis of said sleeve, a contact element slidable within said sleeve and provided with a rack, a spring opposing the movement of said contact element in one direction, and motion converting connections between said rack and the pointer of the dial indicator for transmitting the reciprocating motion of said rack as rotary motion applied to said pointer.

4. In combination with the frame of an outside micrometer calipers, said frame being provided with a bearing, a sleeve rotatably and slidably mounted in said bearing, and having a series of graduations readable with reference to said bearing, a dial indicator carried by said sleeve and having a pointer, a contact element slidable within said sleeve, and motion converting connections between said contact element and the pointer of said dial indicator for transmitting the reciprocation of said contact element as rotary motion applied to said pointer.

5. In combination with the frame and anvil of an outside micrometer calipers a dial indicator rotatably mounted upon said frame and having a pointer, means for holding the adjustment of said indicator relative to said frame, a contact element slidable within said indicator and provided with a rack, a spring opposing the movement of said contact element in one direction, a gear segment engaging said rack, a second rack meshing with said gear segment, and motion transmitting connections between said second-named rack and the dial indicator pointer.

6. In combination with the frame and anvil of an outside micrometer calipers, a dial indicator slidably and rotatably mounted upon said frame and having a pointer, a single means for holding both the rotative and the sliding adjustments of said indicator relative to said frame, a contact element slidable within said indicator and provided with a rack, a spring opposing the movement of said contact element in one direction, a gear segment meshing with said rack, and motion transmitting connections between said gear segment and the dial indicator pointer.

7. A dial indicator attachment for the frame of an outside micrometer calipers, said frame having an anvil and a spindle bearing in alinement with said anvil, said attachment comprising a sleeve longitudinally and rotatably adjustable in said spindle bearing of the calipers frame, a contact element slidable in said sleeve, a dial indicator comprising a base carried by said sleeve, a casing extending from said base and disposed transversely to the axis of said sleeve, and a dial surmounting said casing and provided with a pointer, and operative connections between said contact element and the pointer of said dial indicator.

8. A dial indicator attachment for the frame of an outside micrometer calipers, said frame having an anvil and a spindle bearing alined with said anvil, said attachment comprising a sleeve longitudinally and rotatably adjustable in said spindle bearing, means for holding the adjustments of said sleeve relative to said frame, a contact member slidable within said sleeve, a dial indicator mounted on said sleeve with its dial disposed in a plane parallel to the longitudinal axis of said sleeve, said dial indicator having a pointer, and operative connections between said contact member and said pointer.

9. In a device capable of use as either an outside or inside micrometer, a frame having a fixed anvil and an opposed bearing, a sleeve rotatably and longitudinally adjustable in said bearing, a contact element slidable within said sleeve, a micrometer indicator mounted on said sleeve and means for transmitting motion from said sliding contact to said indicator.

10. In a device capable of use as either an outside or an inside micrometer, a frame having a fixed anvil and an opposed bearing, a member rotatably and longitudinally adjustable in said bearing, a contact element slidable within said member, a terminal contact on one end of said member, tension means within said member between said terminal contact and said slidable contact element, a dial indicator mounted on said member and rotatable therewith and means for transmitting motion from said slidable contact stem to said indicator.

11. In a device capable of use as either an outside or an inside micrometer, a frame having a fixed anvil and an opposed bearing, a sleeve rotatably adjustable in said bearing, a contact element slidable within said sleeve, a stationary contact in one end of said sleeve, tension means within said sleeve between said stationary contact and said slidable contact element, a dial indicator mounted on said sleeve and adapted to be rotated therewith, said sleeve extending transversely of said indicator means for transmitting motion from said slidable contact stem to said indicator, and means for holding the rotative adjustment of said indicator relative to said frame.

12. In a frame provided with a bearing, a sleeve slidably mounted in said bearing, an indicator carried by said sleeve, said sleeve extending transversely with respect to said indicator, a contact element slidable within said sleeve and motion conveying connections between said contact element and said indicator for transmitting the variations of said contact element to said indicator, and means for holding the sliding adjustments of said indicator relative to said frame.

13. In a frame provided with a bearing, a sleeve rotatably and slidably mounted in said bearing, an indicator carried by said sleeve and rotatable therewith, said sleeve extending transversely to said indicator, and a contact element slidable within said sleeve and motion conveying connections between said contact element and said indicator for transmitting the variations of said contact element to said indicator.

14. In a frame provided with a bearing, a sleeve rotatably mounted in said bearing, a contact element slidable within said sleeve, an indicator carried by said sleeve and adapted to be operated by said contact element, said sleeve extending transversely of said indicator, said indicator being rotatable with said sleeve with respect to said bearing.

In testimony whereof I affix my signature.

ROBERT J. O. SIMPSON.